United States Patent
Kim

(10) Patent No.: US 9,035,521 B2
(45) Date of Patent: May 19, 2015

(54) ROTOR OF A MOTOR

(75) Inventor: Yongchul Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 217 days.

(21) Appl. No.: 13/483,572

(22) Filed: May 30, 2012

(65) Prior Publication Data

US 2013/0043753 A1 Feb. 21, 2013

(30) Foreign Application Priority Data

Aug. 16, 2011 (KR) ........................ 10-2011-0081035

(51) Int. Cl.
*H02K 21/12* (2006.01)
*H02K 1/27* (2006.01)

(52) U.S. Cl.
CPC ...................................... *H02K 1/276* (2013.01)

(58) Field of Classification Search
USPC ............. 310/156.01, 156.12, 156.53, 156.56
See application file for complete search history.

(56) References Cited

U.S. PATENT DOCUMENTS

| | | | |
|---|---|---|---|
| 6,353,275 B1* | 3/2002 | Nishiyama et al. | 310/156.53 |
| 7,500,848 B2* | 3/2009 | Maeda et al. | 425/542 |
| 7,646,125 B2* | 1/2010 | Okamoto et al. | 310/156.53 |
| 7,652,405 B2* | 1/2010 | Adaniya et al. | 310/216.055 |
| 7,808,144 B2* | 10/2010 | Tajima et al. | 310/156.53 |
| 7,851,959 B2* | 12/2010 | Tajima et al. | 310/156.57 |
| 2007/0145849 A1* | 6/2007 | Okamoto et al. | 310/156.53 |
| 2010/0194228 A1* | 8/2010 | Lee et al. | 310/156.53 |
| 2011/0254474 A1* | 10/2011 | Saito et al. | 318/139 |

* cited by examiner

*Primary Examiner* — Thanh Lam
(74) *Attorney, Agent, or Firm* — Saliwanchik, Lloyd & Eisenschenk

(57) ABSTRACT

Provided is a rotor core of a motor, the rotor core, the rotor core including a thin disk-shaped rotor core member, a shaft hole penetratively formed at a center of the rotor core member, a shaft press-fitted into the shaft hole, a plurality of magnet insertion holes penetratively formed at a position near to a periphery of the rotor core member for inserted coupling by a magnet, and a magnet fixing unit formed by stacking the rotor core members each at a predetermined height, and press-fitting the shaft into the shaft hole, wherein the rotor core members are stacked at a predetermined height, and the shaft is inserted into the shaft hole.

4 Claims, 3 Drawing Sheets

ROTOR OF A MOTOR

CROSS-REFERENCE TO RELATED APPLICATION

This application claims the benefit under 35 U.S.C. §119 of Korean Patent Application No. 10-2011-0081035, filed Aug. 16, 2011, which is hereby incorporated by reference in its entirety.

BACKGROUND

1. Field of Endeavor

The present disclosure relates to a rotor core for a BLDC motor.

2. Background

This section provides background information related to the present disclosure which is not necessarily prior art.

In general, a rotor of a BLDC (Brushless direct current) motor is formed by press-fitting a shaft into a rotor core formed by being stacked with thin rotor core members. At this time, the rotor core member is arranged with magnet insertion holes, each at a predetermined gap, for inserting a magnet at a position near to a periphery.

Each shape of the magnet insertion hole is so arranged as to correspond to that of the magnet that is to be inserted, and each magnet generally takes an approximately trapezoidal shape, as the magnet is inserted with a member such as insulating paper, to form pockets at both sides of the magnet insertion hole where the pocket is a space sufficient enough to insert the insulating paper.

However, in a case the magnet insertion hole is formed with a shape a bit different from that of the magnet, the magnet may move or rotate inside the magnet insertion hole to generate a horizontal position scattering inside the rotor core, because of decreased adhesive force of an adhesive in long term use even if the magnet is secured by the adhesive.

In a case the horizontal position scattering is generated by the position change, a cogging torque becomes unstable due to inconsistent maintenance of magnetic force in the rotor to disadvantageously deteriorate a control characteristic of the rotor.

It is, therefore, desirable to overcome the above problems and others by providing an improved rotor core of a motor.

BRIEF SUMMARY

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide a rotor core of a motor improved in a shape of a magnet insertion hole, whereby an insertion/coupled position of a magnet can be constantly maintained.

In one general aspect of the present disclosure, there is provided a stacked rotor core of a motor, the rotor core comprising: a thin disk-shaped rotor core member; a shaft hole penetratively formed at a center of the rotor core member; a shaft press-fitted into the shaft hole; a plurality of magnet insertion holes penetratively formed at a position near to a periphery of the rotor core member for inserted coupling by a magnet; and a magnet fixing unit formed by stacking the rotor core members each at a predetermined height, and press-fitting the shaft into the shaft hole.

Preferably, but not necessarily, the magnet insertion hole forms a pocket at an upper surface of the magnet fixing unit with a predetermined width.

Preferably, but not necessarily, a length of a surface opposite to the magnet of the pocket is longer than a length of a surface surface-contacted by the magnet fixing unit and the magnet.

Preferably, but not necessarily, the pocket is formed lest all the facing surfaces be not parallel.

Preferably, but not necessarily, the magnet is provided in a rectangular shape in a cross-section thereof.

The rotor core of motor according to the present disclosure has an advantageous effect in that a pocket space is provided capable of inserting insulating paper as in the prior art, and a magnet position fixing rib capable of supporting both ends of a magnet is formed at some sections, whereby horizontal position scattering of the magnet can be inhibited to provide an improved control characteristic of the motor through cogging torque stabilization.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there have been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
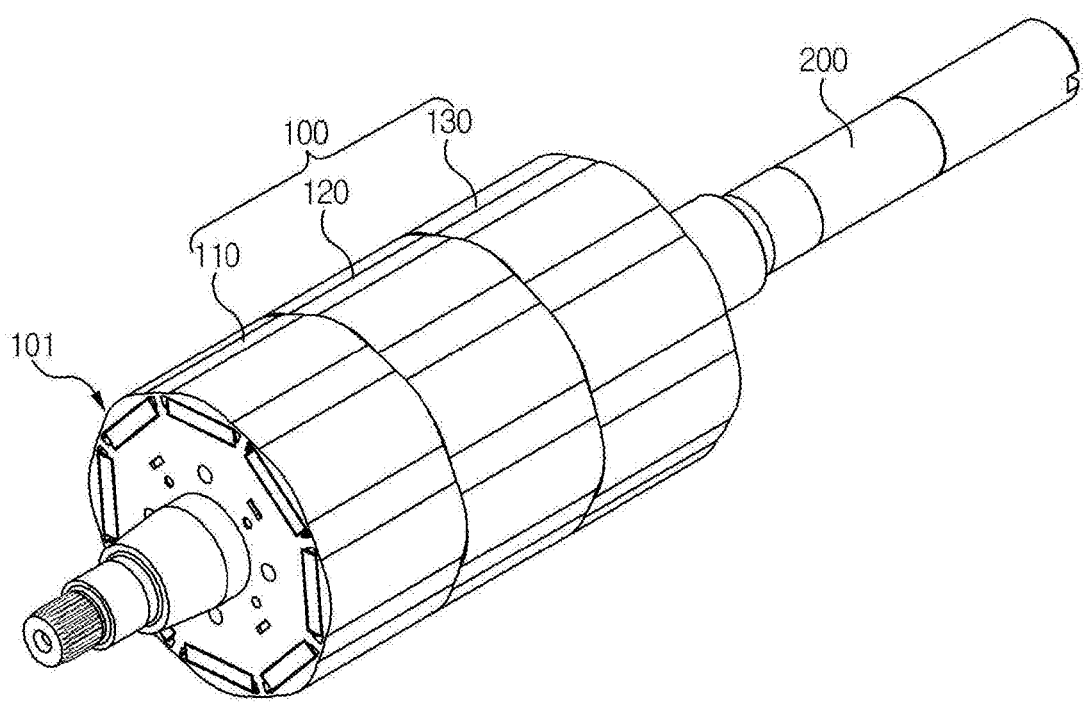
FIG. 1 is a schematic perspective view illustrating an assembled state of a rotor core according to an exemplary embodiment of the present disclosure.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a rotor motor of motor according to the present disclosure will be described in detail with reference to the accompanying drawings.

Hereinafter, the present disclosure will be described based on an example of a BLDC motor among many motors, however, configuration of BLDC motor has nothing to do with the subject matter of the present disclosure, such that a detailed description of the BLDC motor will be omitted and a stacked rotor core of a motor, which is the characteristic configuration of the present disclosure, will be concentratively described.

Figure 2:
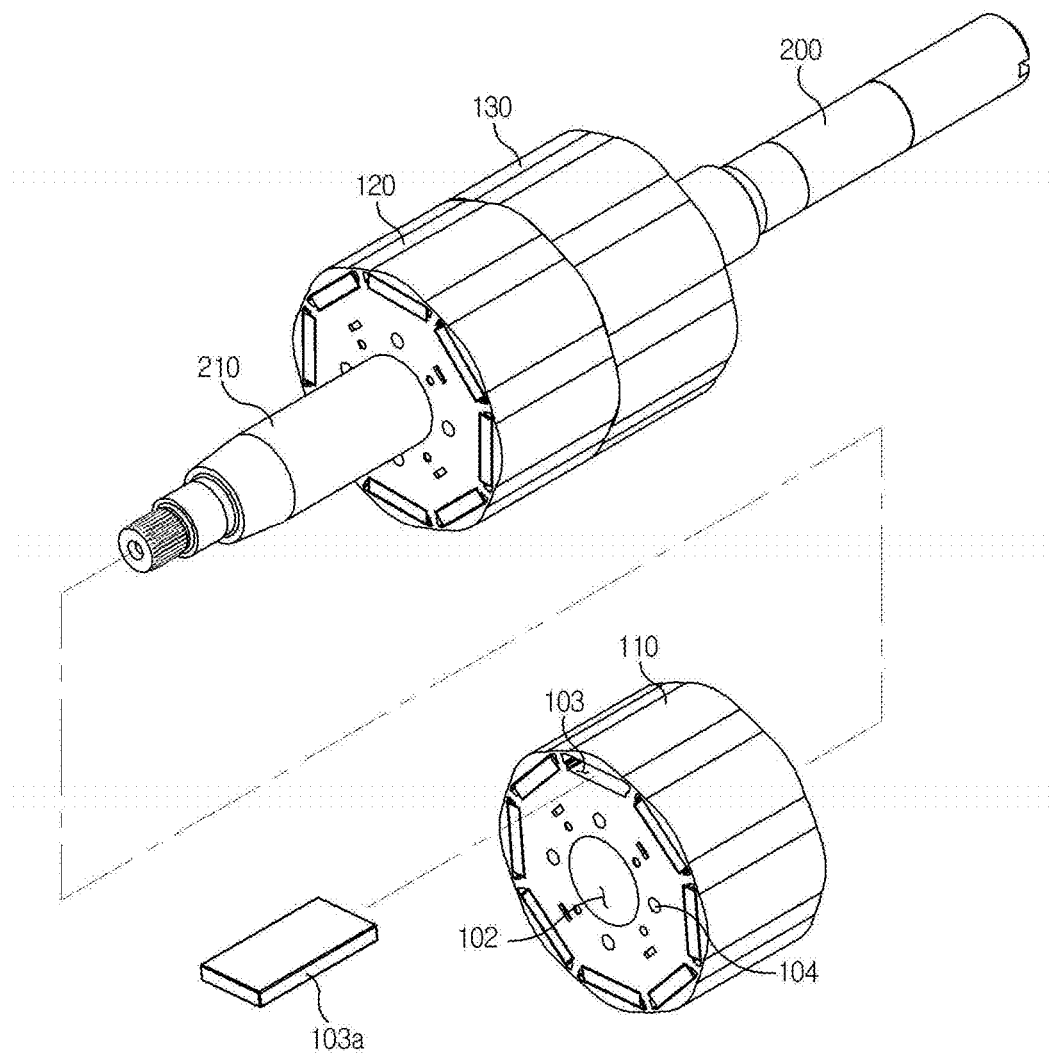
FIG. 2 is an exploded perspective view of FIG. 1.
Figure 3:
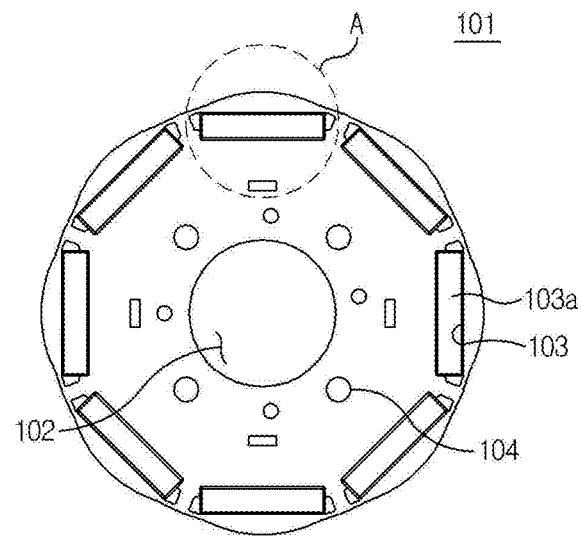
FIG. 3 is a plan view illustrating the rotor core of FIG. 1.
Figure 4:
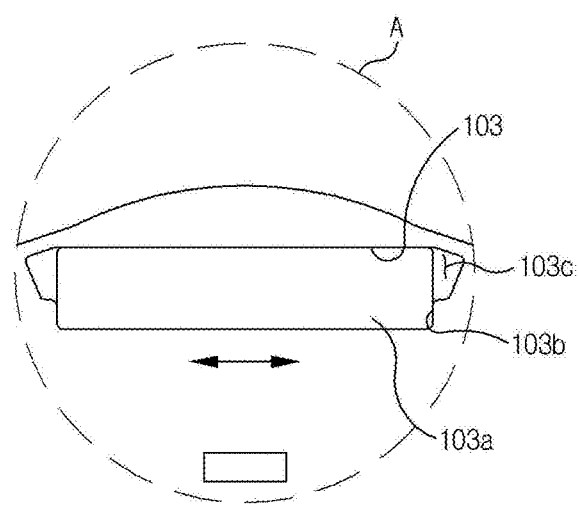
FIG. 4 is a cross-sectional view taken along line A-A of FIG. 3.

FIG. 1 is a schematic perspective view illustrating an assembled state of a rotor core of BLDC motor according to a first exemplary embodiment of the present disclosure, FIG. 2 is an exploded perspective view of FIG. 1, FIG. 3 is a plan view illustrating the rotor core of FIG. 1, and FIG. 4 is a cross-sectional view taken along line A-A of FIG. 3.

Referring to FIGS. 1 and 2, a stacked rotor core of a motor includes a stacked rotor core (100) provided with a plurality of rotor core members (101) and a shaft (200).

The rotor core member (101) takes a shape of a thin iron plate with a thickness of approximately 0.5 mm. The rotor core member (101) is formed by punching a thin iron plate, and a plurality of rotor core members is stacked to form the rotor core (100).

Referring to FIG. 1, the rotor core (100) is formed with first, second and third rotor cores (110, 120, 130) stacked with the rotor core members (101), each at a same height and each at a predetermined angle of deviation, through which a shaft (200) is press-fitted.

A shaft hole (102) is formed at a center of the rotor core member (101) to allow the shaft (200) to pass therethrough. The shaft hole (102) is preferably formed with an approximately round shape.

A magnet insertion hole (103) is penetratively formed at a position near to a periphery of the rotor core member (101). The magnet insertion hole (103) is inserted and coupled by a magnet (103a) insertedly coupled to a direction parallel with a center shaft of the shaft hole (102).

According to an exemplary embodiment of the present disclosure, the magnet (103a) is preferably formed with a cross-section of an approximate rectangle, and each of the magnets (103a) inserted into the magnet insertion hole (103) is preferably formed with a same size.

Preferably, a plurality of magnet insertion holes (103) is penetratively formed each at a predetermined interval, and according to an exemplary embodiment of the present disclosure, a total of eight (8) pieces of regular octagonal magnet insertion holes (103) is preferably formed along a periphery of the rotor core member (101).

Meanwhile, the number of magnet insertion holes (103) may increase or decrease depending on changed size of rotor core, in addition to the number of total of eight magnet insertion holes, such that the number of magnet insertion holes may include a regular pentagon (5 pieces), a regular hexagon (6 pieces) or more than eight (8) pieces of regular octagonal magnet insertion holes.

Referring to FIGS. 3 and 4, a magnet fixing unit (103b) is formed at an inner circumferential surface of the magnet insertion hole (103) to surface-contact both distal ends of the magnet (103a) inserted into the magnet insertion hole (103). That is, the magnet fixing unit (103b) is provided in a trench shape corresponding to a shape of the magnet (103a) formed at some sections of the inner circumferential surface of the magnet insertion hole (103), to surface-contact a surface opposite to the magnet (103a) insertedly coupled to the magnet insertion hole (103), whereby the magnet (103a) is inhibited from moving horizontally as indicated in an arrow of FIG. 4.

A pocket (103c) is formed at an upper surface of the magnet fixing unit (103b) with a predetermined width, whereby there is no interference with the magnet (103a). At this time, a length of a surface opposite to the magnet (103a) of the pocket (103c) is preferably longer than a length of a surface surface-contacted by the magnet fixing unit (103b) and the magnet (103a).

Furthermore, the pocket (103c) is preferably formed lest all the facing surfaces be not parallel. According to this configuration, in a case the magnet (103a) is inserted in to the magnet insertion hole (103), the pocket (103c) remains in a void space, into which an insulating paper may be inserted, and a space for inhibiting the magnet (103a) from moving may be insertedly coupled.

A fixing pin hole (104) is provided to allow a fixing pin (not shown) for coupling each rotor core member (101) into one rotor core to be insertedly coupled. The fixing pin hole (104) is preferably formed with a through hole having a diameter of approximately 2~3 mm. A plurality of fixing pin holes (104) is preferably formed, and as shown in the drawing, it is preferred that the plurality of fixing pin holes be diagonally formed. For example, as shown in FIG. 3, in a case where four fixing pin holes (104) are provided, each fixing pin hole (104) is preferably symmetrical relative to a center of the shaft hole (102). For example, as shown in FIG. 3, in a case four fixing pin holes (104) are provided, each of the fixing pin hole (104) is horizontally and vertically symmetrical relative to a center of the shaft hole (102), such that imaginary extension lines connecting each facing fixing pin hole (104) are orthogonal.

Meanwhile, the shaft (200) is press-fitted into the shaft hole (102) provided at the rotor core (100) to rotatably support the rotor core (100). The shaft (200), as illustrated in FIG. 2, is formed with a rotor core accommodation unit (210) having a diameter corresponding to that of the shaft hole (102).

The rotor core accommodation unit (210) is performed with a surface smoothing treatment using mechanical means, e.g., knurling or skiving to inhibit the shaft (200) from idling inside the shaft hole (102). A distal end of one side of the shaft (200) is provided with a gear to transfer a power generated by rotation of the rotor core (100) to an outside. Configuration and operation of the shaft (200) have little relationship with the subject matter of the present disclosure, such that detailed description thereto is omitted.

According to the present disclosure thus described, the magnet (103a) insertedly coupled to the rotor core (100) can be secured and coupled to a precise position of each of the magnet insertion holes (103), whereby, even if the rotor core (100) is rotated for a long term period, instability of cogging torque may be solved that may be generated when magnetic field of the rotor is changed in response to a so-called magnet scattering phenomenon that changes the position of the magnet (103a).

Although the foregoing has described and exemplified a BLDC motor, the present disclosure is not limited thereto, and other types of motors using rotors may be applied with the novel concept of the present disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A rotor of a motor, the rotor comprising:
   a plurality of thin disk-shaped rotor core members;
   a shaft hole penetratively formed at a center of each rotor core member;
   a plurality of fixing pin holes formed at each rotor core member;
   a shaft press-fitted into the shaft hole;
   a plurality of magnet insertion holes penetratively formed at a position near a periphery of each rotor core member for an inserted coupling by a magnet; and
   a magnet fixing unit formed by stacking the plurality of the rotor core members wherein each rotor core member has a predetermined height, and press-fitting the shaft into the shaft hole;
   wherein the fixing pin holes are symmetrically formed with respect to a center of the shaft hole; and
   wherein each of the plurality of magnet insertion holes comprises a pocket, wherein the pocket is configured to have a length of a surface of the pocket opposite to the magnet that is longer than a length of a surface of the pocket that is surface-contacted by the magnet fixing unit and the magnet, such that the magnet is inhibited from horizontal moving.

2. The rotor of claim 1, wherein the pocket is formed at an upper surface of the magnet fixing unit with a predetermined width.

3. The rotor of claim 2, wherein the pocket is formed lest all the facing surfaces be not parallel.

4. The rotor of claim 1, wherein the magnet is provided in a rectangular shape in a cross-section thereof.

* * * * *